United States Patent [19]

Kamata

[11] Patent Number: 5,452,036
[45] Date of Patent: Sep. 19, 1995

[54] PHOTOGRAPHIC FILM CARTRIDGE, LENS-FITTED FILM UNIT FOR USE THEREWITH, AND ASSEMBLING/DISASSEMBLING METHOD FOR THE FILM UNIT

[75] Inventor: Kazuo Kamata, Saitama, Japan

[73] Assignee: Fuji Photo Film Co., Ltd., Kanagawa, Japan

[21] Appl. No.: 137,268

[22] Filed: Oct. 18, 1993

[30] Foreign Application Priority Data

Oct. 16, 1992 [JP] Japan .............................. 4-278810
Oct. 16, 1992 [JP] Japan .............................. 4-278811
Oct. 16, 1992 [JP] Japan .............................. 4-278812

[51] Int. Cl.⁶ .............................................. G03B 17/26
[52] U.S. Cl. ................................... 354/275; 354/288
[58] Field of Search .................................. 354/275, 288

[56] References Cited

U.S. PATENT DOCUMENTS

| | | | |
|---|---|---|---|
| Re. 34,168 | 1/1993 | Ohmura et al. | 354/288 |
| 5,146,255 | 9/1992 | Nakai et al. | 354/288 |
| 5,231,438 | 7/1993 | Smart | 354/288 |

*Primary Examiner*—David M. Gray
*Attorney, Agent, or Firm*—Young & Thompson

[57] ABSTRACT

A lens-fitted film unit includes a film housing by which photography is effected. The film housing is preloaded with a film cartridge having a shutter rod rotatable within a film passage port. The shutter rod, when in a closed state, blocks the passage port so as to prevent ambient light from entering, and, when in an open state, allows passage of the film. A helical cam groove of the shutter rod cooperates with a stationary pin inside a cartridge-containing chamber, so as to set the shutter rod in the open state while the film cartridge is contained in the film housing. In a preferred embodiment, a bottom door of the film unit is latched by using of a locking lever. The shutter rod is retained open while the bottom door is latched. The bottom door is unlatched by releasing the locking lever, so as to leave the bottom door openable. The shutter rod is rotated in the closed state as soon as the bottom door is unlatched.

25 Claims, 13 Drawing Sheets

PHOTOGRAPHIC FILM CARTRIDGE, LENS-FITTED FILM UNIT FOR USE THEREWITH, AND ASSEMBLING/DISASSEMBLING METHOD FOR THE FILM UNIT

BACKGROUND OF THE INVENTION

1. Field of the Invention

The present invention relates to a photographic film cartridge, a lens-fitted film unit for use therewith, and an assembling/disassembling method for the film unit. More particularly, the present invention relates to a lens-fitted film unit loaded with a film cartridge having a shell formed of resin, and a film unit assembling/disassembling method.

2. Description of Related Art

A conventional 135-type photographic film cartridge includes a cartridge shell which is constituted of a tube formed from a thin metal plate and a pair of end caps. A photographic film (hereinafter referred to as film) is wound on a spool formed from resin. The spool is rotatably mounted in the cartridge shell. A film passage port is formed in the cartridge shell. Light-blocking ribbons are attached to the inside of the passage port, so as to prevent ambient light from entering into the cartridge shell through the passage port. It is regarded as desirable nowadays to be able to recycle the parts of the cartridge after use, because discarded waste of industrial products damages the environment. The conventional cartridge having a metal shell is disadvantageous, because the spool of the cartridge is resinous and must be treated differently from the shell. Recycling of the conventional cartridge therefore requires disassembly of the shell and classification of the parts, and is characterized by conspicuously low efficiency in practice.

There is a proposal to form a cartridge shell from resin similar to that of the spool, and of using an openable cover member for preventing ambient light from entering into the cartridge shell through the passage port.

Lens-fitted film units (hereinafter referred to simply as film units) are now on the market, e.g. under the trade name "Fujicolor Quick Snap" (manufactured by Fuji Photo Film Co., Ltd.) Such known film units are a single-use camera preloaded with photographic film. The film unit has a main body provided with a film supply chamber and a cartridge chamber formed on opposite horizontal sides of a taking lens. The unexposed film is wound in a roll in the film supply chamber. An externally rotatable winding wheel is coupled with a spool in the conventional cartridge contained in the cartridge chamber. A user who has purchased the film unit winds the film frame by frame back into the cartridge after each exposure. The film unit in its entirety is forwarded to a photo laboratory after exposure of the film. An operator at the laboratory unloads the film, and handles it for development and printing. It is possible for the operator to remove the cartridge from the film unit in a lighted room, because the cartridge has the ribbons which keep out ambient light incident on the passage port.

However, the passage port, through which the cartridge is openable by use of the cover member as described above, is apt to admit ambient light into the cartridge shell and would expose the film in the cartridge to light even after photography. The known cartridge having a resinous shell has such a disadvantage, even though better for recycling. The exposed film is withdrawn from the cartridge which has been unloaded from the film unit. Prior to withdrawing the exposed film from the cartridge, the cover member of a cartridge processed in a lighted room must be kept tightly closed by external operation. If the exposed film is handled in a darkroom all before withdrawal from the cartridge, this causes problems of low efficiency and inconsistency of processing of films from a number of different cartridges.

SUMMARY OF THE INVENTION

In view of the foregoing problems, an object of the present invention is to provide a photographic film cartridge and a lens-fitted film unit for use therewith, in which both improved recyclability and preventing against entry of ambient light are accomplished compatibly, as well as an assembling/disassembling method for the film unit.

In order to achieve the above and other objects of this invention, a lens-fitted film unit includes a film housing adapted to effect photography and a film cartridge preloaded in the film housing. The film cartridge has a shutter disposed in a film passage port. The shutter, when assuming a closed state, blocks the passage port so as to prevent ambient light from entering the film cartridge, and, when assuming an open state, allows the film to pass through the passage port. Shutter setting means set the shutter in the open state while the film cartridge is contained in the film housing.

In a preferred embodiment, a bottom door of the film unit is latched by locking means when a bottom opening is closed by the bottom door. The shutter is retained in the open state while the bottom door is latched. The bottom door is unlatched by releasing the locking means, so as to leave the bottom door openable. The shutter is rotated to the closed state in response to the operation of unlatching the bottom door.

According to the invention, the cartridge containing the spool, after the film has been removed from the cartridge, can be melted, pelleted, remolded or regenerated, and utilized as material for products to be newly manufactured. No particular external operation is required to keep the shutter tightly closed, prior to withdrawing the exposed film from the cartridge. The films from a number of cartridges accumulated from film units can be processed with great efficiency and consistency on a huge scale. Prevention against entry of ambient light into the cartridge can be accomplished compatibly with improved recyclability.

BRIEF DESCRIPTION OF THE DRAWINGS

The above and other objects and advantages of the present invention will become more apparent from the following detailed description when read in conjunction with the accompanying drawings, in which.

DETAILED DESCRIPTION OF PREFERRED EMBODIMENTS

Figure 1:
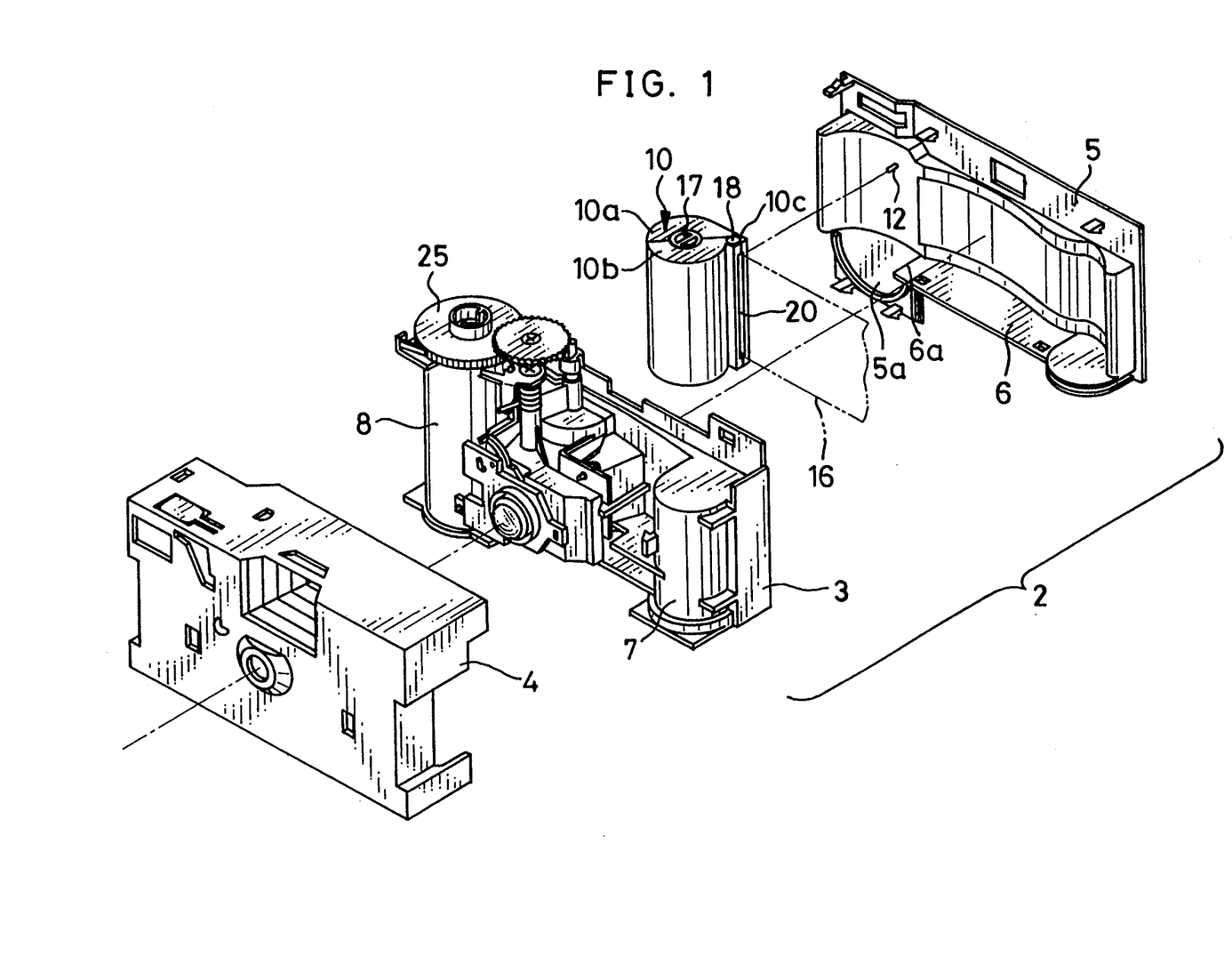
FIG. 1 is an exploded perspective view illustrating a lens-fitted film unit according to the invention.

FIG. 1 illustrates a lens-fitted film unit incorporating a photo film cartridge. A film housing 2 of the film unit is constituted of a main body 3 molded from resin, and front and rear covers 4 and 5 to be secured respectively to the front and the rear of the main body 3. The main body 3 is provided with a shutter mechanism having a shutter blade, a film winding mechanism, and other components for selectively exposing film 16. The front cover 4 covers the shutter mechanism in front of the main body 3. The rear cover 5 covers the rear of the main body 3 in light-tight fashion, and comes in contact with the back surface of the film 16 to position the film 16 on an exposure frame.

The rear cover 5 has a bottom plate 6 and a bottom door 5a which together cover the bottom of the main body 3. There is a line 6a between the bottom plate 6 and the bottom door 5a defining the location of the latter under a cartridge chamber 8. When the bottom door 5a covers the bottom of chamber 8, it is enclosed in light-tight fashion. The bottom door 5a, unlike the bottom plate 6, is connected to the rear cover 5 via a hinging portion of reduced thickness such that the bottom door 5a can be swung open separately from the bottom plate 6. To unload a film cartridge 10 from the main body 3 after exposure of the film 16, the bottom door 5a is opened in the course of disassembling the film unit.

The cartridge 10 to be assembled into the film housing is constituted of upper and lower resinous shell halves 10a and 10b, a rotatable spool 17 on which the film 16 is wound, and a shutter rod 18 which is rotatably contained in a film passage port 20 formed between the shell halves 10a and 10b. At least one end of the shutter rod 18 appears externally through one end face of the cartridge 10. As will be described later (see FIG. 12), the cartridge 10 is constructed such that, when the spool 17 is rotated, a leader 16a of the film 16 can be advanced from the inside to the outside of the cartridge 10.

Figure 2A:
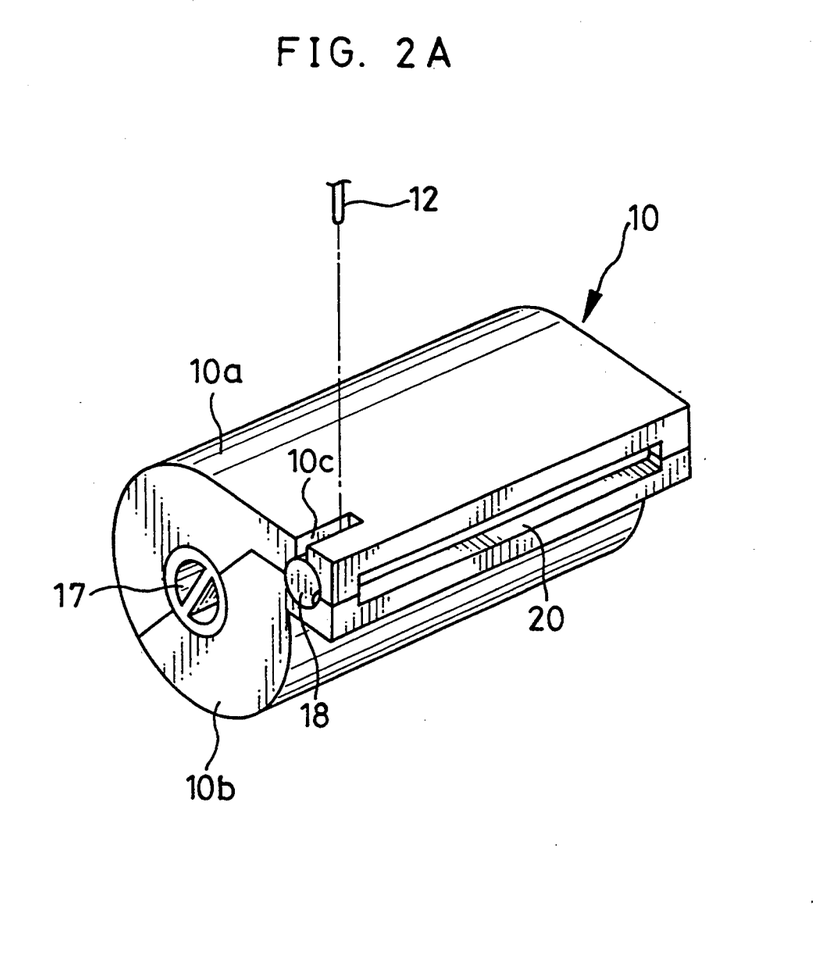
FIG. 2A is a perspective view illustrating a film cartridge according to the invention, contained in the film unit in FIG. 1.
Figure 2B:
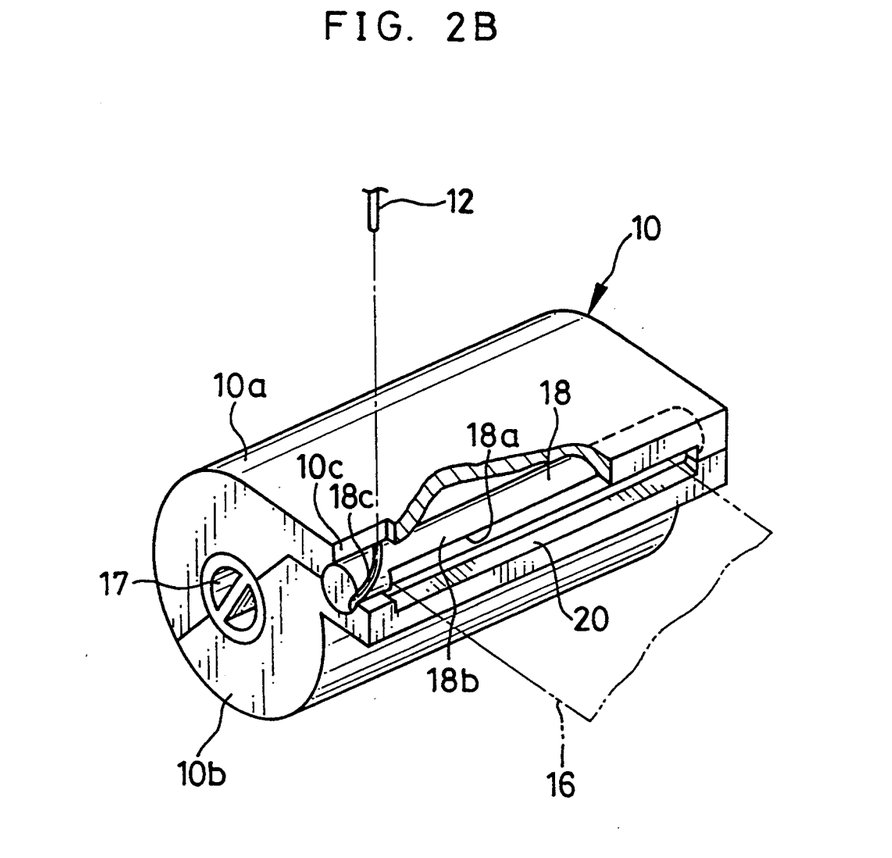
FIG. 2B is a perspective view, partly broken away, illustrating the film cartridge of FIG. 2A.
Figure 3A:
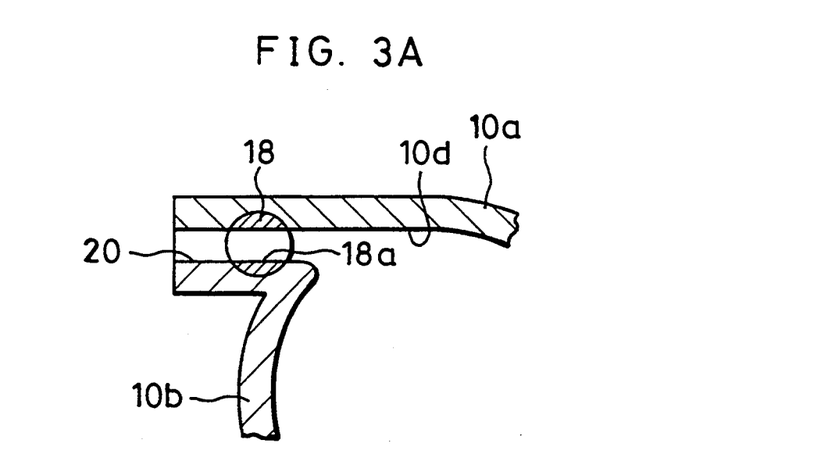
FIG. 3A is an explanatory view illustrating a passage port of the cartridge when the shutter rod is open.
Figure 3B:
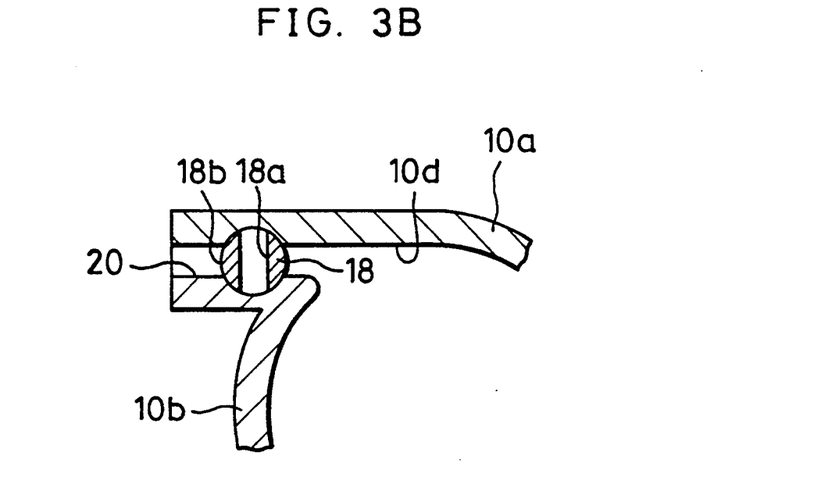
FIG. 3B is an explanatory view illustrating the passage port when the shutter rod is closed.

As shown in FIG. 2B, the shutter rod 18 is provided with a slot 18a. When the shutter rod 18 is in an open state as depicted in FIG. 3A, the slot 18a is aligned with the passage port 20 to open the passage port 20. When the shutter rod 18 is in a closed state as depicted in FIG. 3B, two rod walls 18b block the passage port 20 in light-tight fashion to prevent ambient light from entering the roll chamber 10d. FIG. 2B shows a helical cam groove 18c formed on a cylindrical surface of the shutter rod 18 near to one end thereof. In the upper shell half 10a is formed an access slot 10c (FIG. 2A) through which a portion of the cam groove 18c is accessible. A stationary pin 12, formed on the rear cover 5, passes through the access slot 10c and engages with the cam groove 18c.

The stationary pin 12 is unitary with the rear cover 5, is located near to the top of the chamber 8, and projects toward the cartridge 10 to enter into the access slot 10c. The pin 12 regulates the shutter rod 18 incorporated in the cartridge 10 as follows: the pin 12 retains the shutter rod 18 in the open state while the film unit is loaded with the cartridge 10, and moves the shutter rod 18 into a closed position when the cartridge 10 is removed after winding of all the film into the cartridge 10.

The operation of the above construction will now be described. The front cover 4 is secured to the main body 3 in a lighted room. The cartridge 10, prior to being loaded into the film unit, is placed in a dark box. The shutter rod 18 is rotated to the open state of FIG. 3A. The spool 17 is rotated to advance the leader 16a out of the cartridge 10. The film 16 is drawn out of the cartridge 10. A fork is used to pick up the leader 16a, and winds the film 16 into the form of a roll, while drawing the film 16 out of the cartridge 10. The film 16 in roll form is placed in the film supply chamber 7 of the main body 3. Before mounting of the rear cover 5, a bottom opening of the chamber 8 is not covered by the bottom door 5a, FIG. 1. The cartridge 10 and the withdrawn roll of film 16 is inserted into the main body 3 through the bottom of the main body 3.

After the cartridge 10 and the film 16 are inserted into the main body 3, the rear cover 5 is mounted. The position of the cartridge 10 is so regulated as to engage the stationary pin 12 through the access slot 10c with the cam groove 18c which is externally accessible. While the shutter rod 18 is in the open state, an extreme rotational position of the cam groove 18c at the rod wall 18b is located in registry with the access slot 10c. The pin 12, after insertion of the cartridge 10 into the main body 3, is brought into engagement with this extreme portion of the cam groove 18c in the rotational position at the rod wall 18b. The rear cover 5 is then mounted on the main body 3, the rear thereof being shielded from ambient light. The bottom door 5a is then closed.

Figure 4:
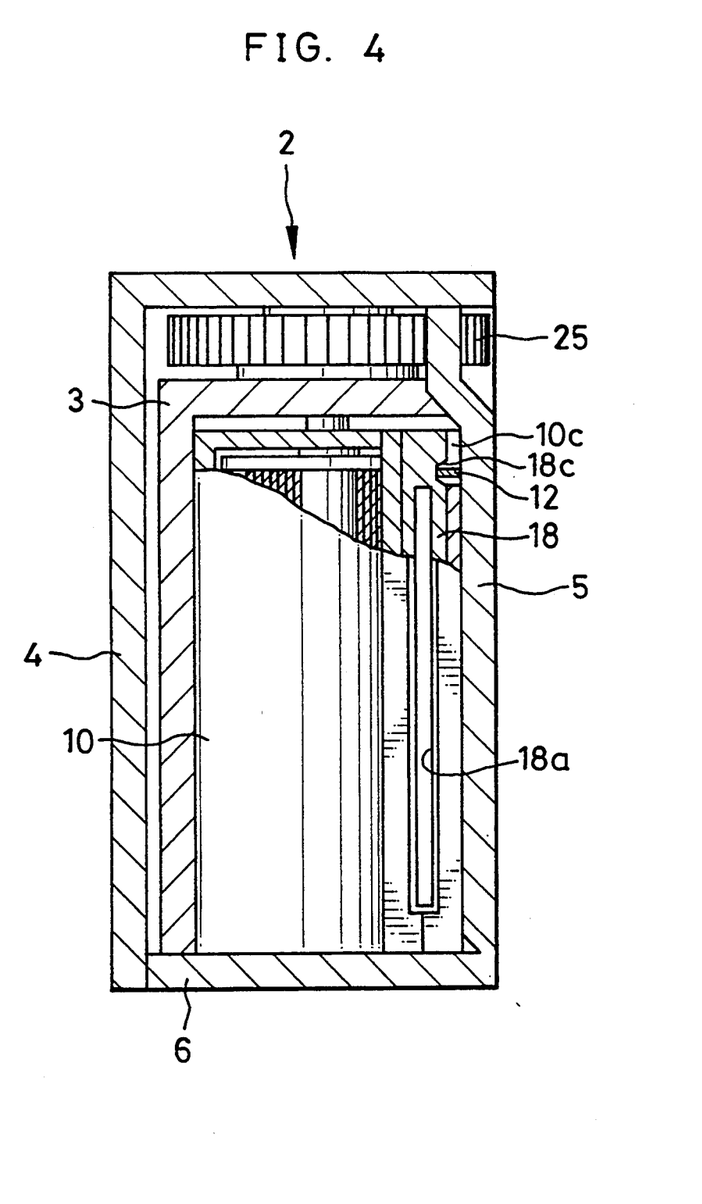
FIG. 4 is a cross sectional view of the film unit of FIG. 2A, with the cartridge shown partly broken away.

With the assembly completed, the film housing 2 is covered in a cardboard packaging having surfaces on which information and external decoration is printed. The film unit can be used while it remains packaged within the cardboard packaging, because the packaging has openings permitting operation of the film unit. After each exposure of the film 16, a film winding wheel 25 as shown in FIG. 4 is rotated. The spool 17 in the cartridge 10 is thereby rotated, to wind one exposed frame of the film 16 into the cartridge 10. After the final frame is exposed, the wheel 25 is rotated so as to wind up all the film 16 into the cartridge 10.

After using all the film, the film unit is forwarded to a photo laboratory, where the cardboard packaging is removed. The cartridge 10 is next removed from the film housing 2 by processing in a lighted room. To do so, the bottom door 5a is first opened. The cartridge 10 in the chamber 8 is pulled down out of the film housing 2. The shutter rod 18, in the course of pulling down the cartridge 10, is rotated clockwise as viewed in FIG. 3A, by co-action of the cam groove 18c with the stationary pin 12. When the cartridge 10 is completely removed from the film housing 2, the shutter rod 18 has been rotated to the closed station shown in FIG. 3B.

With the shutter rod 18 in the closed state, the passage port 20 is blocked to shield the roll chamber 10d from ambient light. Although the passage port 20 is free of conventional light-blocking ribbons, the cartridge 10 can nevertheless be removed from the film unit in a lighted room, because of the construction by which the shutter rod 18 is moved to its closed position at the same time as the cartridge 10 is removed. It is thereby possible to mold the parts for the cartridge 10 from the same resin, and it is also very easy to recycle the cartridge.

When the film 16, after exposure of all frames, is to be removed from the cartridge 10 for development, the leader 16a is advanced to the outside in response to rotation of the spool 17. The leader 16a, when advanced by rotating the spool 17, is pulled out so as to withdraw the exposed film 16 from the cartridge 10 with great ease.

Note that the ends of the shutter rod 18, despite the depicted structure in which they appear through the end faces of the cartridge, may instead be rotatably supported within the cartridge while borne on the inside of the end faces. The stationary pin 12 can be either integral with, or a piece separately secured to, the rear cover 5. It is necessary to form the pin 12 with strength sufficient to resist being broken or deformed by the shutter rod 18 in the course of rotating the shutter rod 18 via the cam groove 18c.

Figure 5:
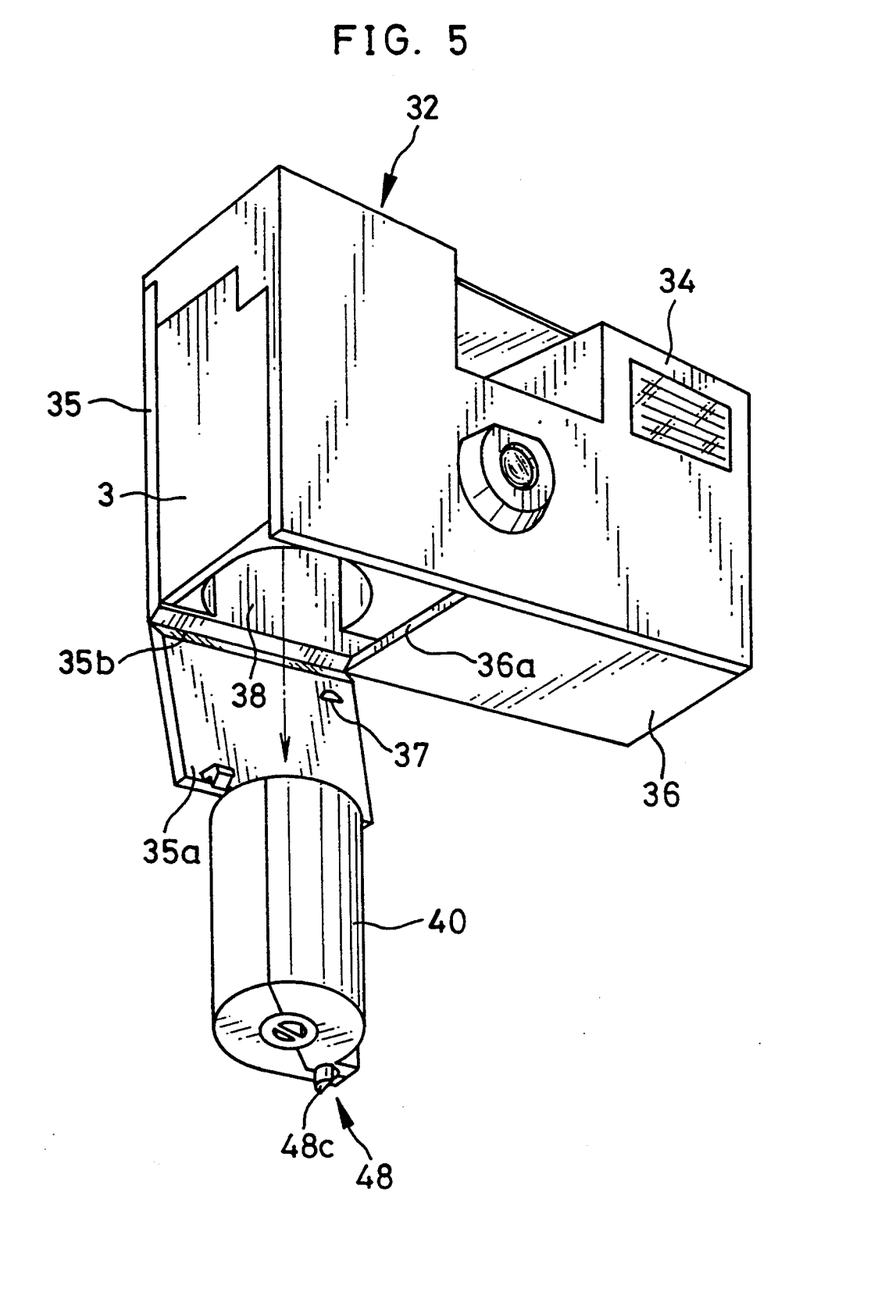
FIG. 5 is a perspective view illustrating another preferred embodiment of the film unit, from which a film cartridge is being unloaded.

FIG. 5 illustrates another preferred embodiment. Elements similar to those in the above embodiment are designated with the same reference numerals. A bottom door 35a has a regulating recess 37 of a crescent or semi-circular shape. A shutter rod 48 is incorporated in a cartridge 40. The regulating recess 37 is so positioned as to receive a lower axial end of the shutter rod 48 when the cartridge 40 is inserted into a chamber 38. The regulating recess 37 does not pass through, but is a recess in, the bottom door 38a. When the main body 3 contains the cartridge 40, the regulating recess 37 is engaged with the shutter rod 48 and retains it in the open station. To remove the cartridge 40 having the film 16 after photography, the shutter rod 48 is rotated until it arrives at the closed position. Note that the front of the main body 3 is covered by a front cover 34. A bottom plate 36 covers the main body 3 under the chamber 38. The bottom door 35a is fitted on the bottom along a line 36a.

Figure 6:
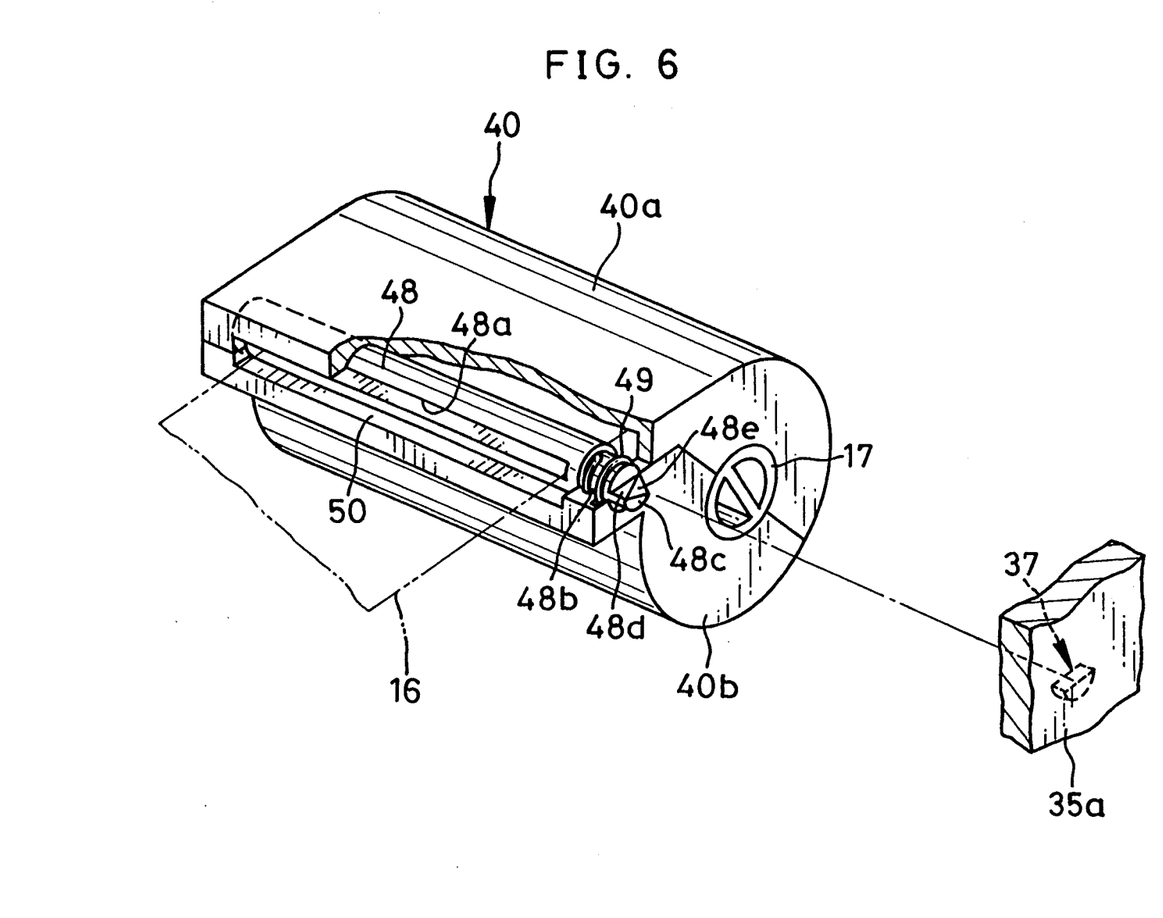
FIG. 6 is a perspective view, partly broken away, illustrating the cartridge of FIG. 5 with a bottom door of the film unit.

As illustrated in FIG. 6, one axial end of the shutter rod 48 has a thin shaft 48b having a smaller diameter. The cylindrical surface of the thin shaft 48b is provided with a spring 49 coiled thereon. One end of the spring 49 is fixed on the shutter rod 48 via a small hole formed in the shutter rod 48 for receiving the spring end. The other end of the spring 49 is fixed on a shell of the cartridge 40 via a small hole formed between shell halves 40a and 40b for receiving the other spring end. The spring 49 urges the shutter rod 48 counterclockwise as viewed in FIG. 6 toward the closed state as in FIG. 3B. The distal end of the thin shaft 48b passes through an end face of the cartridge 40, and has a crescent-shaped projection 48c projecting relative to the plane of the end face of the cartridge 40. The projection 48c, as viewed in section, is shaped in a crescent or semi-circle, and is normally molded together with the shutter rod 48. The projection 48c has a planar upright face 48d, and a slanted guiding face 48e so shaped that the projection 48c is cut away with reference to a diagonal line of a quadrilateral defined by the upright face 48d. The guiding face 48e is adapted to promote smooth insertion of the projection 48c into the regulating recess 37 for engagement.

The operation of this embodiment will now be described. The cartridge 40 is loaded into the film housing 32. The shutter rod 48 is set in the open state similar to that shown in FIG. 3A, against the action of the spring 49. The film 16 is drawn out of the cartridge 40. The withdrawn film 16 is wound in a roll and positioned in the film supply chamber 7 of the main body 3. The spring 49 has recovery force, which, while the film 16 is positioned through slot 48a, causes the shutter rod 48 to clamp the film 16 between the inside of a passage portion 50 and the rod walls of the shutter rod 48. Before mounting of the rear cover 35, a bottom opening of the chamber 38 is not yet covered by the bottom door 35a in the state similar to FIG. 1. The cartridge 40 and the roll of the withdrawn film 16 are inserted into the main body 3 through the bottom of the main body 3.

Figure 7:
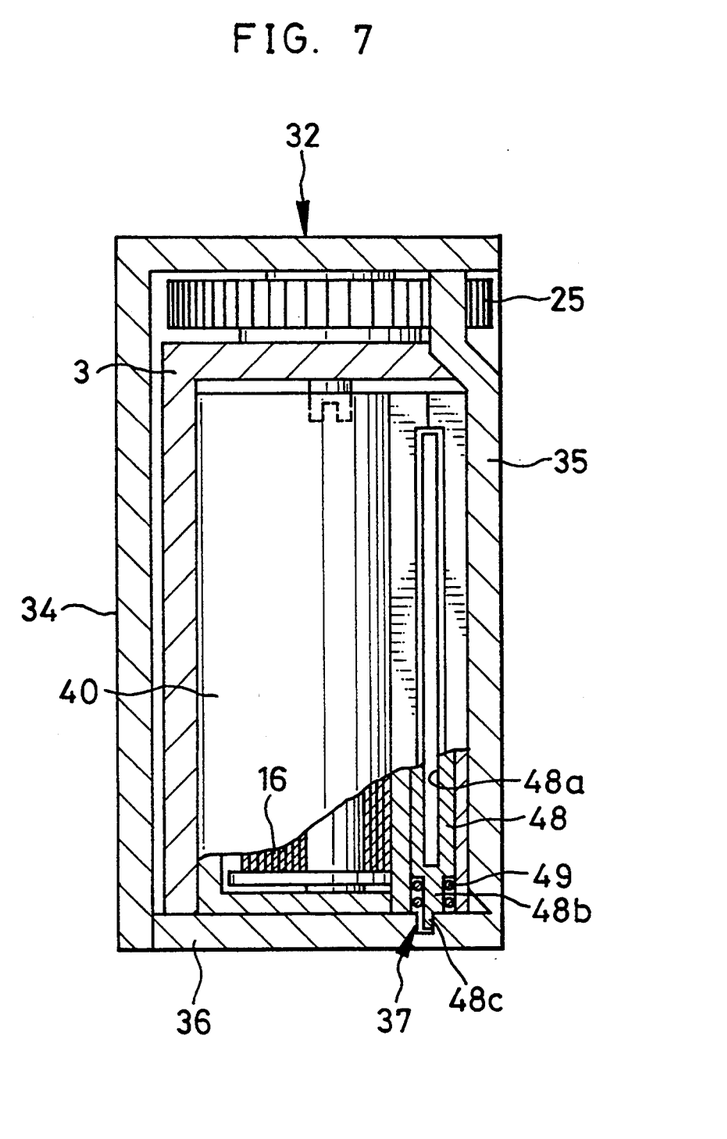
FIG. 7 is a cross sectional view illustrating the film unit of FIG. 6, with the cartridge shown partly broken away.

After the cartridge 40 and the film 16 are inserted into the main body 3, the bottom door 35a is closed. The projection 48c projecting from the end face of the cartridge 40 is received in the regulating recess 37. While the film 16 is clamped inside the passage port 50, the shutter rod 48 is not in the fully open state but is urged toward the closed state by the action of the spring 49. If the shutter rod 48 lacked the slanted guiding face 48e, then it would be difficult for the regulating recess 37 to receive the projection 38c, as the upright face 48d, coming in contact with the inside of the regulating recess 37, would not be reliably fitted on the planar portion in the regulating recess 37, with the shutter rod 48 shifted toward the closed state. In view of this, the projection 48c has the guiding face 48e. Once the bottom door 35a has begun to close, the guiding face 48e enters into the regulating recess 37 while contacting the inside of the recess 37. Further closing movement of the bottom door 35a rotates the shutter rod 48. When the bottom door 35a is completely closed, the planar face 48d of the projection 48c is fitted inside the recess 37, so as to bring the shutter rod 48 into the fully open state. In use, after each exposure of the film 16, the film winding wheel 25 in FIG. 7 is rotated to wind one exposed frame of the film 16 into the cartridge 40.

The film unit after photography is forwarded to a photo laboratory. The cartridge 40 is removed from the film housing 32 by processing in a lighted room. First, the bottom door 35a is opened. In the course of opening the bottom door 35a, the projection 48c is disengaged from the regulating recess 37 in the bottom door 35a. Upon this disengagement, the recovery force of the spring 49 causes the shutter rod 48 to rotate counterclockwise as viewed in FIG. 6, until it reaches the closed state.

In the above embodiment, the bottom door 35a is provided with regulating recess 37 and the bottom end face of the cartridge 40 is provided with projection 48c. Alternatively, a shown in FIG. 8, it is possible to provide a top surface inside a cartridge chamber 61a with a regulating hole 68, while providing a top surface of a cartridge 66 with a projection 67c. In loading the main body 61 of a film housing 60 with tile cartridge 66, a bottom door 63a formed on rear cover 63 is closed. Once the bottom door 63a has begun to close, the projection 67c enters into the regulating hole 68 while contacting the inside of the hole 68. Further closing movement of the bottom door 63a rotates a shutter rod 67. When the bottom door 63a is completely closed, the projection 67c is fitted inside the hole 68, so as to rotate the shutter rod 67 into the fully open state.

Figure 8:
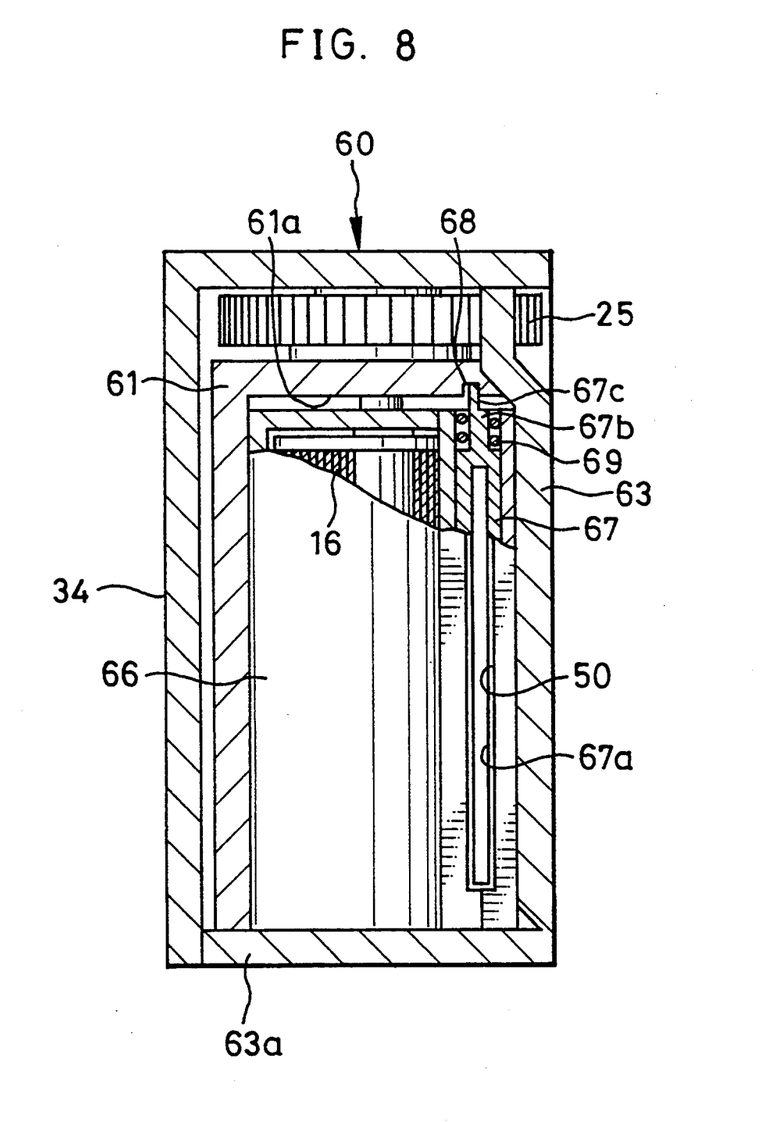
FIG. 8 is a cross sectional view illustrating a further preferred embodiment of the film unit, with the cartridge shown partly broken away.

To remove the cartridge 66 from the film housing 60 after photography, the bottom door 63a is opened. In the course of opening the bottom door 63a, the projection 67c is disengaged from the regulating hole 68. Upon this disengagement, the recovery force of a spring 69 causes the shutter rod 67 to rotate, until it reaches the closed state. Note that a slot 67a is adapted to align with the passage port 50 in the open state. The cylindrical surface of a narrower shaft 67b has the spring 69 coiled thereon.

Figure 9:
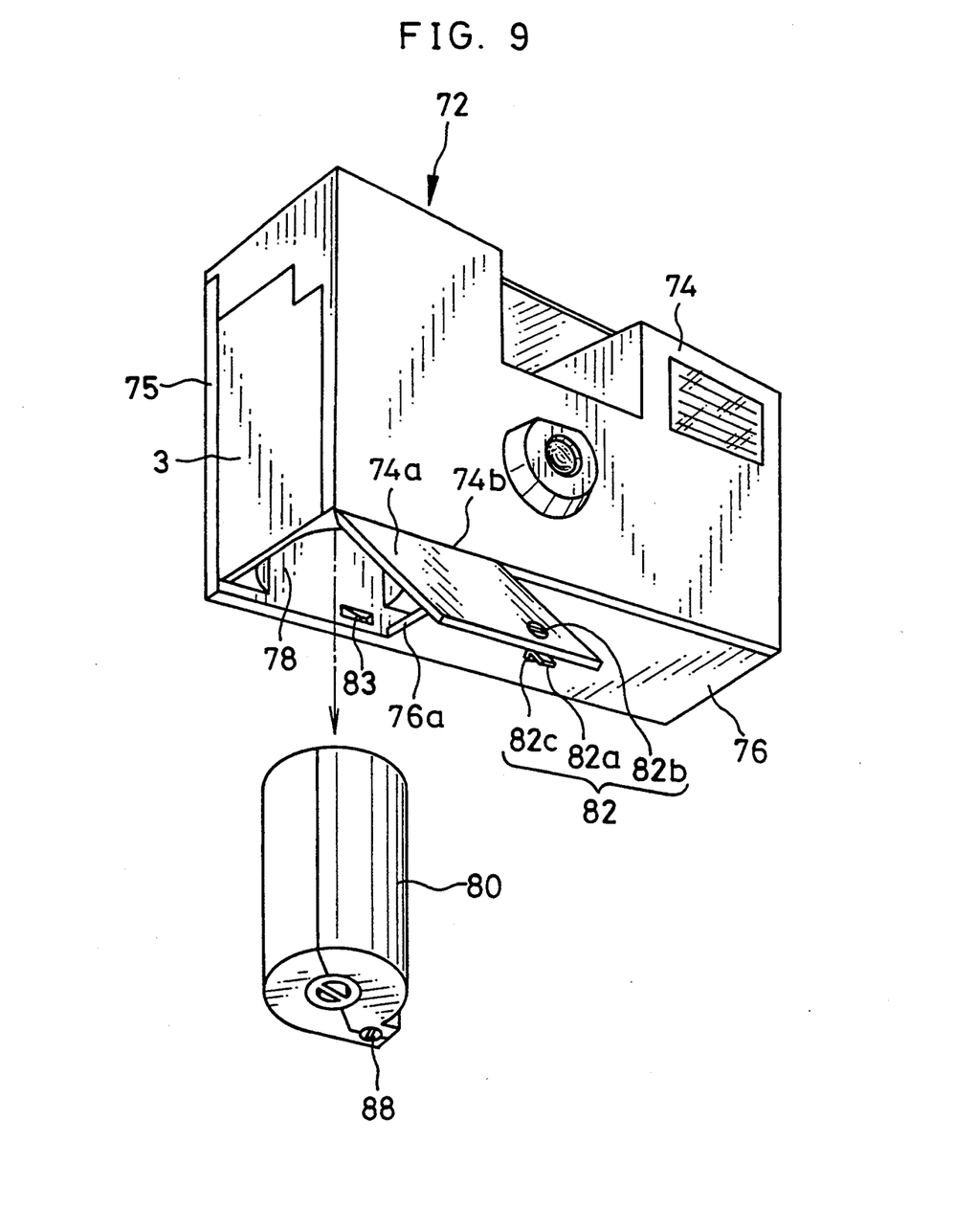
FIG. 9 is a perspective view illustrating still another preferred embodiment of the film unit, from which a film cartridge is being unloaded.

FIG. 9 illustrates still another preferred embodiment of the invention. Elements similar to those in the above embodiments are designated with the same reference numerals. A rear cover 67 has a bottom plate 76, which covers the bottom of the main body 3, and is recessed at a line 76a. The front of the main body 3 is covered by a front cover 74, to which the bottom door 74a is connected via a hinging portion 74b of a reduced thickness such that the bottom door 74a may be swung open. The bottom door 74a is fitted on the bottom of the main body 3 along the line 76a.

Figure 10:
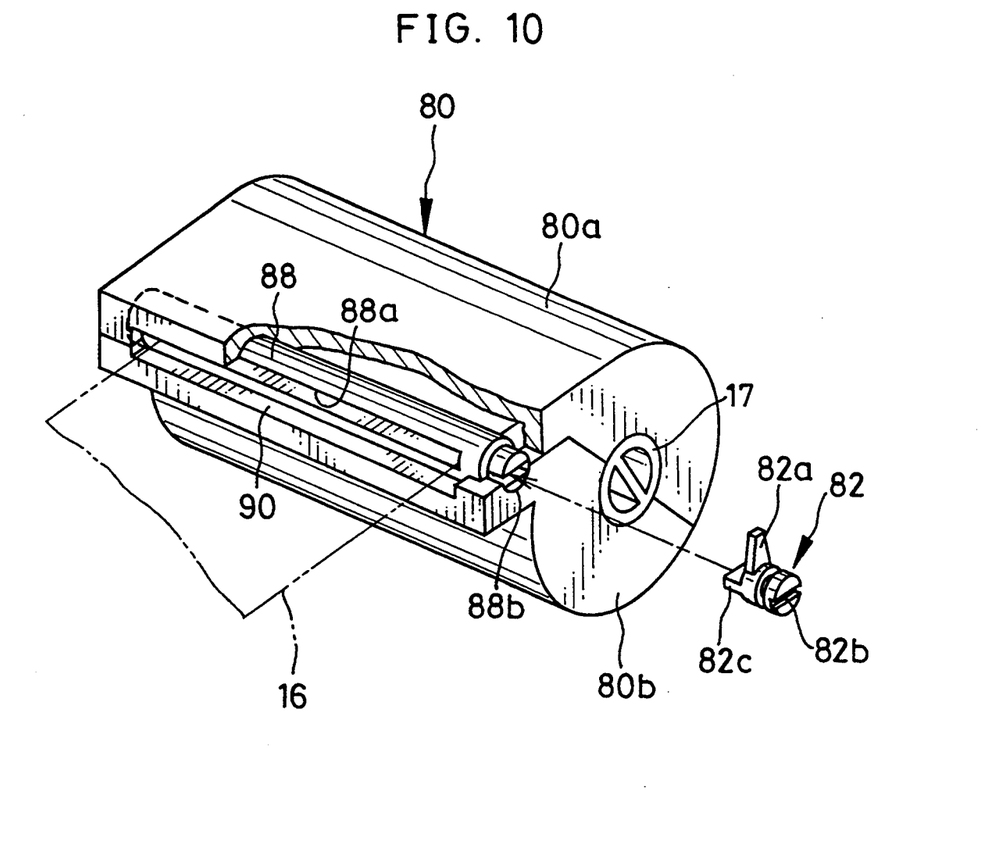
FIG. 10 is a perspective view, partly broken away, illustrating the cartridge of FIG. 9 with an operable locking lever of the film unit.

There is an externally operable locking lever 82 fitted through the bottom door 74a. The lever 82 includes a latching projection 82a for latching the bottom door 74, an engageable grooved face 82b whereby the lever 82 is externally accessible, and a driving projection 82c for rotation shutter rod 88. The latching projection 82a is adapted to engage with a hole 83 formed in the rear cover 75. When the engageable face 82b at the bottom of film housing 72 is rotated by use of a screwdriver or the like, the latching projection 82a is disengaged from the hole 83 so as to allow an operator to open the bottom door 74a. As shown in FIG. 10, the driving projection 82c, projecting into chamber 78, is engaged with an engageable grooved face 88b of the shutter rod 88 incorporated in the cartridge 80. Note that a slot 88a is adapted to align with the passage port 90 in the open state of rod 88. The groove in rod end 88b is parallel to the direction of film travel through slot 88a. A passage portion 90 is formed between two shell halves 80a and 80b.

The operation of this embodiment will now be described. After the front cover 74 is secured on the main body 3, the cartridge 80 and film 16, in a darkroom, are inserted into the main body 3. The bottom door 74a is then partially closed, after which the engageable end 82b is rotated until the groove in end 82b projects rearwardly of the bottom door 74a. When the shutter rod 88 is in the open state as depicted in FIG. 10, the groove in the rod end 88b is directed in the same direction as the passage port 90. Upon closing the bottom door 74a, the driving projection 82c comes in contact with the rod end 88b. In the initial step of rotation of the lever 82, the driving projection 82c is pressed against the rod 88b of the shutter rod 88. After full rotation of the lever 82, the driving projection 82c is fitted into the groove of rod end 88b, so as to retain the shutter rod 88 in the open state.

Figure 11:
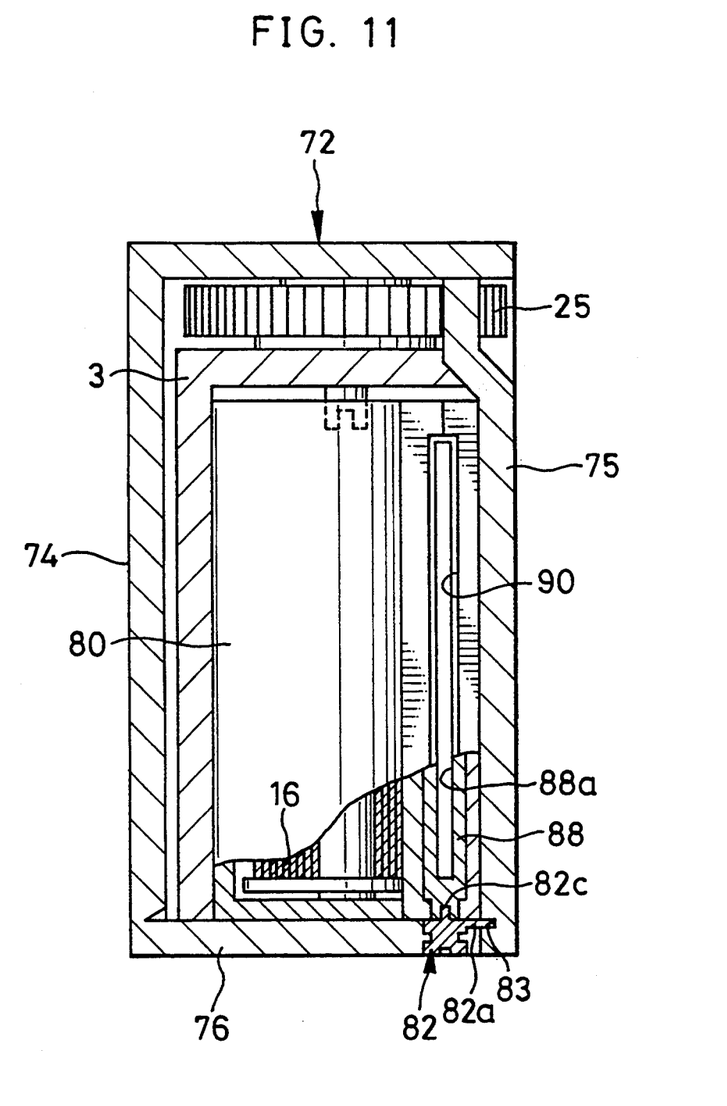
FIG. 11 is a cross sectional view illustrating the film unit of FIG. 9 with the cartridge shown partly broken away.

Then the rear cover 75 is secured to and covers the main body 3. At this time, the bottom door 74a is latched on the rear cover 75, because the latching projection 82a is retained in the hole 83 as illustrated in FIGS. 9 and 11. In use, after each exposure of the film 16, the film winding wheel 25 is rotated, to wind one exposed frame of the film 16 into the cartridge 80.

The film unit after photography is forwarded to a photo laboratory. The cartridge 80 is removed from the film housing 72 in a lighted room. First, the bottom door 74a is opened. To unlatch the bottom door 74a, a screwdriver is engaged with the engageable end 82b and rotates the lever 82 clockwise. The latching projection 82a is thereby disengaged from the hole 83, which allows the bottom door 74a to be easily opened. In the course of this disengagement, the driving projection 82c rotates the rod end 88b, thereby causing the shutter rod 88 to rotate clockwise as viewed in FIGS. 10 and 11, until it reaches the closed state.

In the above construction, the film 16 must be completely wound up into the cartridge 80 inward from the shutter rod 88, before the shutter rod 88 can be rotated to the fully closed state, because, if there is a film portion present in the slot 88a, the film portion prevents rotation of the shutter rod 88 to the fully closed position. When a leader of the film 16 protrudes from the cartridge 80, such a film portion resists full rotation of the shutter rod 88 toward the opening position of the lever 82. This construction is advantageous because, while the film is unexposed either completely or partially, the bottom door 74a is prevented from being opened.

The bottom door 74a can either be integral with, or a piece separately secured to, the front cover 74. With either structure, it is preferable that the novel lever 82, when the bottom door is opened, closes the shutter rod.

Figure 12:
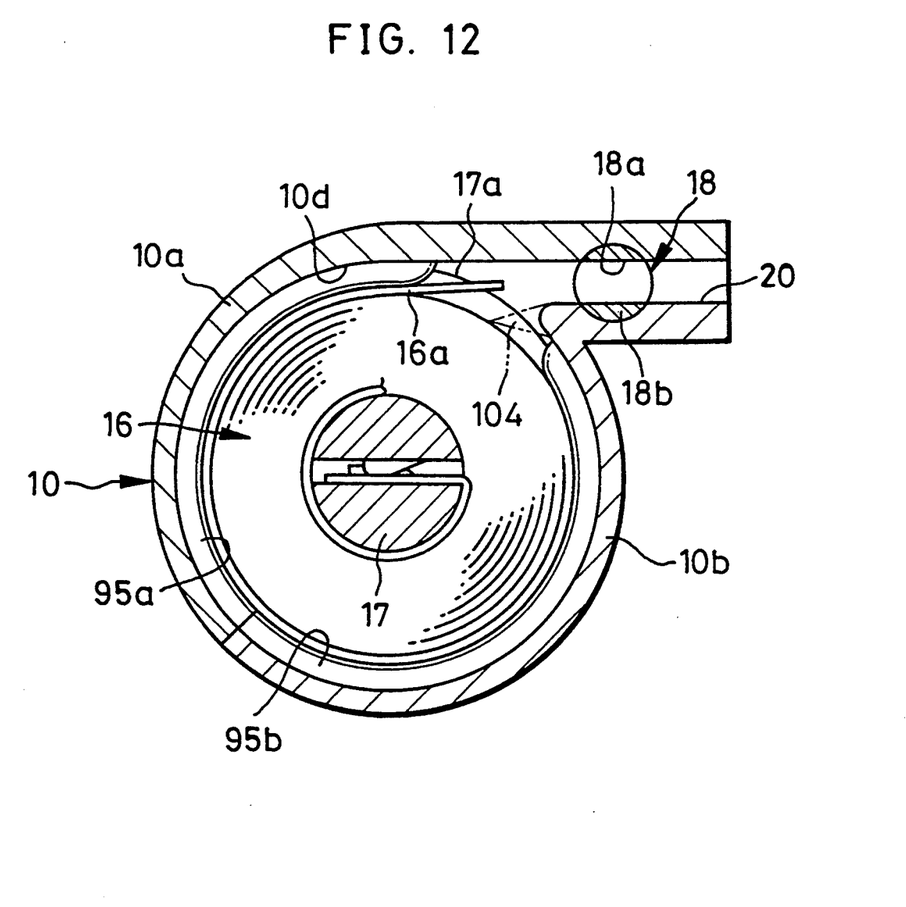
FIG. 12 is a cross sectional view illustrating a structure of the film cartridge from which a leader can be expelled when a spool is rotated.

The leader-advancing operation of the cartridge 10 is illustrated in FIG. 12. When the spool 17 is rotated to withdraw the film 16, the roll of the film 16 rotates as a unit. During the rotation of the roll, two pairs of ridges 95a and 95b are in contact with the outermost turn of the film so that the distal edge of the leader 16a contacts the separator claw 104. In response to this contact with the leader 16a, successive rotation of the spool 17 causes separator claw 104 to separate the leader 16a from the next outermost turn of the roll. The leader as thus separated is directed into the passage port 20, and then departs outside of the cartridge 10. Note that the spool 17 has a pair of flanges 17a adjacent the edges of the roll of the film 16.

Notwithstanding the above description, the present invention is applicable to a conventional film cartridge from which the leader of the film is previously withdrawn out of the cartridge shell before use of the cartridge. The leader would be inserted through the slot in the shutter rod, with the shutter rod therefore assuming an incompletely open state. This avoids the need for any leader-advancing mechanism, and is advantageous in simplification of the cartridge.

Although the present invention has been fully described by way of various preferred embodiments thereof with reference to the accompanying drawings, various changes and modifications will e apparent to those having skill in this field. Therefore, unless these changes and modifications otherwise depart from the spirit of the present invention, they should be construed as included therein.

What is claimed is:

1. A lens-fitted film unit comprising a film housing for effecting photography and a film cartridge preloaded in said film housing, said film cartridge having a shutter disposed in a film passage port, said shutter being movable to a closed state blocking said passage port and preventing ambient light from entering said film cartridge, and an open state allowing said film to pass through said passage port, said film unit further comprising:

shutter setting means for setting said shutter in said open state while said film cartridge is contained in said film housing;

said shutter comprising a shutter rod supported rotatably by said film cartridge and a film passage slot extending through said shutter rod, said slot, when said shutter is in said open state, being aligned with said passage port, and, when said shutter is in said closed state, being out of alignment with said passage port.

2. The lens-fitted film unit as defined in claim 1, wherein said film housing comprises a chamber for containing said film cartridge, a film supply chamber containing a roll of unexposed film withdrawn from said film cartridge, an exposure chamber located between said cartridge-containing chamber and said film supply chamber for effecting exposure of said film, and means for winding an exposed portion of said film back into said film cartridge.

3. The lens-fitted film unit as defined in claim 2, wherein said film cartridge further comprises a cartridge shell defining said passage port and a roll chamber, and a spool disposed rotatably in said roll chamber for winding said film thereon.

4. The lens-fitted film unit as defined in claim 3, wherein said film housing further comprises a main body, a front cover secured to a front portion of said main body, a rear cover secured to a rear portion of said main body; said main body defining said cassette containing chamber, said exposure chamber, said film supply chamber; and a film winding wheel disposed adjacent said cartridge-containing chamber and connected to said spool of said cartridge inside said cartridge-containing chamber.

5. The lens-fitted film unit as defined in claim 4, wherein said film housing further comprises a bottom opening defined beneath said cartridge-containing chamber, and a bottom door for closing said bottom opening, said bottom door being opened when said film cartridge is being removed from said cartridge-containing chamber in an axial direction.

6. The lens-fitted film unit as defined in claim 5, wherein said cartridge shell comprises a pair of shell halves, and said shell halves and said shutter means are of plastic material.

7. The lens-fitted film unit as defined in claim 3, wherein said shutter setting means comprises a helical cam groove formed in an end of said shutter rod, an access opening formed in said cartridge shell for exposing a portion of said cam groove, and a stationary pin projecting interiorly of said cartridge-containing chamber, said pin engaging said helical cam groove through said access opening so as to rotate said shutter rod in said open state when said cartridge is inserted into said cartridge-containing chamber through said bottom opening of said film unit, and to rotate said shutter rod from said open state to said closed state when said film cartridge is removed from said cartridge-containing chamber.

8. The lens-fitted film unit as defined in claim 5, wherein said shutter comprises an engaging groove formed in an end of said shutter rod, a locking lever rotatably secured to said bottom door, and a projection formed on said locking lever, said projection being engaged with said engaging groove so as to retain said shutter rod in said open state while said locking lever latches said bottom door, and said projection causing said shutter rod to rotate to said closed state when said locking lever unlatches said bottom door.

9. The lens-fitted film unit as defined in claim 3, wherein said shutter setting means comprises a crescent-shaped projection formed at an end of said shutter rod and projecting from said cartridge shell, a crescent-shaped recess in said film housing engaging said crescent-shaped projection to retain said shutter rod in said open state, and a spring for returning said shutter rod to said closed state when said crescent-shaped projection is disengaged from said crescent-shaped recess by opening said bottom door.

10. The lens-fitted film unit as defined in claim 9, wherein said crescent-shaped projection is provided with a slanted face which, upon initial engagement of said crescent-shaped projection with said crescent-shaped recess, rotates said shutter rod to a small extent, so as to set in a fully open state said shutter rod having been in a partially open state during insertion of said film through said slot.

11. The lens-fitted film unit as defined in claim 9, wherein said crescent-shaped recess is formed in said bottom door.

12. The lens-fitted film unit as defined in claim 9, wherein said crescent-shaped recess is formed on an interior surface of said cartridge-containing chamber.

13. A film cartridge for use with a lens-fitted film unit, comprising:

a cartridge shell defining a film roll chamber and a film passage port;

a spool contained rotatably in said cartridge shell for winding film;

a shutter rod disposed rotatably in said passage port, said shutter rod being movable to a closed state blocking said passage port and preventing ambient light from entering said film cartridge, and an open state allowing said film to pass through said passage port; and means for cooperating with a lens-fitted film unit for keeping said shutter rod in a completely open state while said film cartridge is contained in said lens-fitted film unit;

wherein a slot is formed through said shutter rod for passage of said film.

14. The film cartridge as defined in claim 13, wherein said cartridge shell, said spool, and said shutter rod are of plastic material.

15. The film cartridge as defined in claim 14, wherein said lens-fitted film unit includes:

a main body;

a cartridge-containing chamber formed in said main body to be preloaded with said film cartridge;

a film supply chamber formed in said main body for containing a roll of said film withdrawn from said film cassette;

an exposure chamber located between said cartridge-containing chamber and said roll chamber for effecting exposure of said film;

a bottom opening defined beneath said cartridge-containing chamber;

a bottom door for closing said bottom opening in light-tight fashion;

a rear cover secured behind said main body for covering in light-tight fashion a rear of said cartridge-containing chamber, said exposure chamber, and said film supply chamber;

a front cover secured in front of said main body; and a film winding wheel mounted on said main body and connected to said spool of said film cartridge inside said cartridge-containing chamber, an exposed portion of said film being wound back into said film cartridge when said winding wheel is rotated.

16. The film cartridge as defined in claim 15, wherein said cooperating means comprises a helical cam groove formed in an end of said shutter rod, and an access opening for exposing said cam groove; a stationary pin projecting from an interior wall of said cartridge-containing chamber, said pin engaging with helical cam groove so as to retain said shutter rod in said completely open state when said cartridge is inserted into said cartridge-containing chamber through said bottom opening, and said pin causing said shutter rod to rotate to said closed state when said film cartridge is removed through said bottom opening.

17. The film cartridge as defined in claim 15, wherein said cooperating means comprises an engaging groove formed in an end of said shutter rod to be engageable with a projection on a locking lever rotatably secured to said bottom door, said locking lever engaging said engaging groove so as to retain said shutter rod in said open state while said locking lever latches said bottom door, and said locking lever causing said shutter rod to rotate to said closed state when said locking lever unlatches said bottom door.

18. The film cartridge as defined in claim 17, wherein said bottom door is swingable on said front cover, and is latched by engagement between a groove in said rear cover and a portion of said locking lever rotated to a latching position after closure of said bottom door, and wherein said projection on said locking lever engages with said engaging groove in said shutter rod during rotation of said locking lever.

19. The film cartridge as defined in claim 15, further comprising a spring for urging said shutter rod toward said closed state, said spring setting said shutter rod in said closed state when said cartridge is removed from said cartridge-containing chamber.

20. The film cartridge as defined in claim 19, wherein said cooperating means comprises a semi-circular portion formed at an end of said shutter rod and projecting from said cartridge shell.

21. The film cartridge as defined in claim 20, wherein said semi-circular portion is inserted into a semi-circular recess formed in a top interior surface of said cartridge-containing chamber during insertion of said film cartridge into said cartridge-containing chamber.

22. The film cartridge as defined in claim 20, wherein said semi-circular portion is provided with a slanted guiding face for promoting smooth insertion of said semi-circular portion into said semi-circular recess.

23. The film cassette as defined in claim 20, wherein said semi-circular portion is inserted into said semi-circular recess formed in said bottom door when said bottom door is secured.

24. A lens-fitted film unit comprising a film housing for effecting photography and a film cartridge preloaded in said film housing, said film cartridge having a shutter disposed in a film passage port, said shutter being movable to a closed state blocking said passage port and preventing ambient light from entering said film cartridge, and an open state allowing said film to pass through said passage port, said film unit further comprising:

shutter setting means for setting said shutter in said open state while said film cartridge is contained in said film housing;

said film cartridge further comprising a cartridge shell defining said passage port and a roll chamber, and a spool disposed rotatably in said roll chamber for winding said film thereon;

said shutter setting means comprising a helical cam groove formed in an end of said shutter, an access opening formed in said cartridge shell for exposing a portion of said cam groove, and a stationary pin projecting interiorly of a cartridge-containing chamber, said pin engaging said helical cam groove through said access opening so as to rotate said shutter in said open state when said cartridge is inserted into said cartridge-containing chamber through said bottom opening of said film unit, and to rotate said shutter from said open state to said closed state when said film cartridge is removed from said cartridge-containing chamber.

25. A lens-fitted film unit comprising a film housing for effecting photography and a film cartridge preloaded in said film housing, said film cartridge having a shutter disposed in a film passage port, said shutter being movable to a closed state blocking said passage port and preventing ambient light from entering said film cartridge, and an open state allowing said film to pass through said passage port, said film unit further comprising:

shutter setting means for setting said shutter in said open state while said film cartridge is contained in said film housing;

said film cartridge further comprising a cartridge shell defining said passage port and a roll chamber, and a spool disposed rotatably in said roll chamber for winding said film thereon;

said shutter setting means comprising a crescent-shaped projection formed at an end of said shutter and projecting from said cartridge shell, a crescent-shaped recess in said film housing engaging said crescent-shaped projection to retain said shutter in said open state, and a spring for returning said shutter to said closed state when said crescent-shaped projection is disengaged from said crescent-shaped recess by opening a bottom door.

* * * * *